(12) United States Patent
Kerti et al.

(10) Patent No.: US 6,319,422 B1
(45) Date of Patent: Nov. 20, 2001

(54) ENVIRONMENTALLY SAFE SNOW AND ICE DISSOLVING LIQUID

(76) Inventors: Jozsef Kerti, Etele U. 19, H-1119 Budapest; Peter Kardos, Bajcsy-Zsilinszky Koz 1., H-1065 Budapest; Tibor Kalman, Toth Lorinc UT. 37., H-1126 Budapest, all of (HU)

(*) Notice: Subject to any disclaimer, the term of this patent is extended or adjusted under 35 U.S.C. 154(b) by 0 days.

(21) Appl. No.: 09/043,704

(22) Filed: Mar. 25, 1998

Related U.S. Application Data

(63) Continuation of application No. PCT/HU96/00025, filed on May 2, 1996.

(30) Foreign Application Priority Data

May 3, 1995 (HU) .................................................. 95 01266

(51) Int. Cl.⁷ .................................................. C09K 3/18
(52) U.S. Cl. .................................................. 252/70; 106/13
(58) Field of Search .................................. 252/70; 106/13

(56) References Cited

U.S. PATENT DOCUMENTS

| | | | |
|---|---|---|---|
| 3,185,648 | * 5/1965 | Standish et al. | 252/70 |
| 3,595,477 | 7/1971 | Wollin | 239/2 |
| 3,624,243 | * 11/1971 | Scott, Jr. et al. | 252/70 |
| 3,630,913 | 12/1971 | Scott et al. | 252/70 |
| 3,806,348 | 4/1974 | Wollin | 106/13 |
| 3,940,059 | 2/1976 | Clark et al. | 239/2 |
| 5,653,054 | * 8/1997 | Savignano et al. | 47/2 |

FOREIGN PATENT DOCUMENTS

1070169 * 1/1967 (GB).

* cited by examiner

Primary Examiner—Anthony Green
(74) Attorney, Agent, or Firm—Ladas & Parry

(57) ABSTRACT

The present invention relates to a snow-and ice dissolving composition comprising an aqueous solution of urea and ammonium-nitrate. The aqueous solution has a mass ratio of (4.5–5.5):(3.6–4.4):(6.3–7.7). In addition, 1.5–2.0 mass per cent of benzoic-acid and/or 0.10–0.25 mass per cent of benzo-or tolyl triazol as corrosion inhibitors can be added.

9 Claims, No Drawings

ENVIRONMENTALLY SAFE SNOW AND ICE DISSOLVING LIQUID

This application is a continuation of PCT/HU96/00025 filed May 2, 1996.

BACKGROUND OF THE INVENTION

1. Field of the Invention

The present invention is a fast acting and environmentally safe, glycol-free liquid which can be applied to a concrete surface to alleviate the slipperiness on public roads, airport runways, railway switches and other objects as well as for eliminating the erosion caused by snow and ice. The composition of the present invention comprises an aqueous solution of urea and ammonium nitrate.

2. Description of the Related Art

One of the fundamental concerns in winter is eliminating the slipperiness associated with snow and ice for pedestrians and vehicles alike. Another concern is the preventing the buildup of snow and ice on railway switches, since a breakdown could result in imminent life-danger.

The bulk of snow and ice is generally removed from a surface by mechanical means (i.e. shovelling, scooping, and sweeping). However, this does not alleviate the slipperiness because an ice film forms and adheres to the surface. On this account, the mechanical means are generally combined with heat transfer, or strewing of chemicals.

The heat transfer can be applied, among others, by a steam sprayer, i.e. by blowing hot steam onto a surface such as an airport runway. This method is costly, hazardous, and the heat-shock damages the concrete. In addition, after the heat transfer is used, an ice film can quickly form when the temperature is under the freezing point in a form often more dangerous than before. Hence, a long-lasting and effective means cannot be obtained by this method.

The most generally used anti-skid chemical is rock salt. Because of its moderate water solubility (above 300 g/liter), it is usually applied to the surface in a solid state. From time to time the rock salt is mixed with sand. The $Cl^-$ ions of the rock salt (and that of the alkaline-earth metal chlorides) act, as pitting corrosion activators, which can heavily damage the iron and steel elements of bridges and overpasses, resulting in decreasing their lifespan which indirectly impedes traffic. The very same goes for damage to gas and water culverts. The rate of the corrosion activated by the $Cl^-$ ions increases if the metallic elements which are embedded in soil are exposed to stray current in the vicinity of D.C. electric transmissions. The peculiarity of the $Cl^-$ ions corrosive effect is especially harmful because of the autocatalytic acceleration of this process caused by continuous accumulation at the corrosion faults, i.e. in the pits. Moreover, the $Cl^-$ ions are stable and no chemical-biological effects can lead to their decomposition, so that they adhere on the metal surface up to its full destruction.

The anions also exert corrosive-erosive effects on concrete as well. The tricalcium-aluminate in the cement forms quaternary hydrates in the presence of water and different anions according to the general formula: $3CaO.Al_2O_3.3CaX.32H_2O$, where X denotes either a bivalent anion, or two monovalent anions. The molar volume of these quaternary hydrates is much larger than that of the original hydrate so that a very great tensile strength occurs in the course of the crystallization leading to bursting and mouldering of the concrete.

In addition to the corrosion-erosion effects, the sodification of the soil due to the $Na^+$ ions is also disadvantageous because it damages vegetal life, which indirectly, effect human and animal life. This damage excludes the use of sea-water for irrigation. Therefore, the de-icing with rock salt, is not an effective means.

From a technical viewpoint, a further drawback of applying rock salt is that it does not act quickly and instantaneously which is often required, for example when railway switches' need de-icing. The chemicals in the rock salt, exert a "thawing" effect by decreasing the freezing point of the solution, even under the ambient temperature, when dissolved in water. This leads to the cooling down of the produced liquid wherein the thawing along with the heat transferred from the less cold environment brings about a change in temperature. This mechanism, however, is slower than it would be with use of liquid thawing chemicals (on account of the rate determining role of the liquid formation) since the rock salt dissolution rate is considerably less when there is a decrease in temperature although its solubility (i.e. saturation point) is practically independent thereof. The slow action is not conducive for de-icing switches as well as of other objects whenever the contact time is short. When applying solid rock salt, the uniform portioning out and distribution is much more circumstantial than when liquids' are sprayed out. Although, there are machines that enable uniform distribution of rock salt, these machines can be expensive and the application of the liquid is not available in a large quantity.

According to the state of art it is known that there is a need to reduce the damage due to the corrosion by use of inhibitors, to prevent the modification by chemicals not containing $Na^+$ ions, and to accelerate the action. However, the agents are applied in the liquid state and these liquids, have many other uses such as in cooling systems of internal combustion. These liquids comprise ethylene-glycol under different trade names and their solutions respectively.

FR 838,638 discloses aqueous solutions of urea in different concentrations that can be combined with rock salt or sodium-hydrocarbonate in order to decrease the freezing point. According to the data given in the patent specification, the urea, by itself, has a freezing point of $-10°$ C., and when in combination with electrolytes has a freezing point of $-20°$ C. This is an obvious advantage of the liquid state when compared to the application of solid urea. The disadvantage to using pure urea is that the action can be slowed down, even in a dissolved state if the temperature is below $-8°$ C. Since urea does not dissociate in aqueous solution, twice the amount is needed to dissolve the identical amount of ice quantity, even compared to the dissociation on rock salt of nearly the same molecular mass. Even if these drawbacks are reduced with the use of electrolytes, the advantage of going without $Na^+$ ions is lost and, by the same token, the drawback of using $Cl^-$ ions is not avoided either.

U.S. Pat. No. 2,233,185 (1938) describes a frost-resistant liquid wherein the solution comprises formate, acetate, propionate and butyrate salts of alkali metals and their combination respectively in a pH range of 8–9 ensuring it by alkali-borate and phosphate buffer salt additives. Different emulsifying mineral oil derivatives are added as an inhibiter and anti-foaming additives. This solution, on account of the limited availability of the chemicals needed, could not find widespread acceptance in practice even in the course of more than half a century since the patent issued although it exhibits several of the important technical advantages described above.

British Patent No. 561,253 (1994) discloses an aqueous solution of sodium acetate combined with a sodium-chromate inhibitor. The drawback of the Na⁺ ions is obviously not eliminated and the method could not be authorized because of the health hazard effect of the chromate ions. Furthermore, the temperature that the solution can work is up to −8° C.

British Patent No. 1,387,810 (1975) discloses a frost resistant de-icing liquid with an aqueous solution of urea and ammonium-chloride and optionally formamide as further component. With this combination, the freezing point of the solution is −16 and −18° C., respectively. Beside the obvious advantage of the solution, there is still the problem, of the Cl⁻ ions.

U.S. Pat. No. 4,689,165 (1985) discloses a liquid serving for heat transference and isopiestic drying. The liquid is described as an aqueous ammonium-nitrate solution in a wide concentration range and admixed with urea and/or formamide and/or dimethyl-formamide and optionally ethylene-glycol. Thiourea, alkyl-polyglycol-ester, hexamethylene-tetramine and mixtures thereof respectively are used as corrosion inhibitors. This liquid cannot be recommended as de-icing medium for public areas because of the health hazard of some of the components therein. Furthermore, U.S. Pat. No. 4,689,165 does not disclose the ammonium-nitrate—urea quantity ratio and their total concentration that could ensure the advantages of this invention.

It has been a widely known effort for a long time to use by-products from the chemical (e.g. sugar and pharmaceutical) industry for de-icing. However, these efforts are restricted by the rigorous hygienic regulations, by the insufficient reproducibility of the by-products and by their fluctuating supply. Although a $CaCl_2$ solution is produced by the neutralizing of the waste hydrochloric acid arising from the chlorination in the organic chemical industry with limestone and/or slaked lime and it is of perfect ice thawing effect and the $Ca^{++}$ cations are, far from sodificating soil components. The use of $CaCl_2$ does not eliminate the disadvantages of the Cl⁻ ions and the uncontrollable origin of the waste hydrochloric acid which runs the risk of environmental pollution.

For de-icing of airport runways and plane surfaces, a number of ethylene-glycol containing liquids have been used which are sprinkled out, usually in an aqueous solution optionally blended with urea and various inhibitors. The toxicity of the glycol and the potential hazard inherent in it contaminating the sweet water and the water used for consumption creates a need for anti-skid measures without glycol.

BRIEF SUMMARY OF THE INVENTION

It has been found that in order to eliminate the slipperiness associated with snow and ice as well as having a product that is environmentally safe, it is advantageous to use fertilizers which infiltrate as a cell-forming nutrient into the vegetal organism in the course of autotrophic assimilation process (biodegradation). Hence, the chemicals, that have anti-skid action, exert only an ad interim effect on the environment and, consequently, the problem arising from the accumulation of the electrolytes' ions (for example Cl⁻) becomes eliminated. As the urea and ammonium-nitrate, are mixed with water in a definite ratio, a ternary system is formed wherein both the urea—water and the ammonim-nitrate—water ratio surpasses the ratio of the compounds solubility in the liquid state and the ternary system can be used without a considerable decrease in dissolving ice, i.e. water absorbing capacity of the solute due to the presence of water in the original liquid (a fundamental difference in comparison to the saturated NaCl solution). Therefore, approximately the same ice dissolving capacity can be attained in the liquid state by means of the ternary composition, than that could be ensured by the chemicals free of water, but of course, with much quicker action, due to the liquid state.

DETAILED DESCRIPTION OF THE INVENTION

It has been discovered through experimentation that the most advantageous composition of the present invention can be attained at the 5:4:7 water—urea—ammonium-nitrate mass ratio, wherein the thermodynamic freezing point of the mixture is −18° C. At this temperature, however, it is the separation not of the water, but of the chemicals that begins, thereby the liquid is diluted and its freezing point decreases to −28° C. attainable at the 8:4:7 mass ratio. This indicates that the freezing point, in the course of the ice dissolution, is decreased which is different from the other de-icing compositions known in the art and the rate of the ice-dissolving process is increased. The liquid, having attained the eutectic composition at −28° C, is further diluted due to the further ice dissolution and attains the original freezing point of −18° C. at 16.5:4:7 ratio. Consequently, the liquid which comprises a 31% water content at 5:4:7 ratio can be diluted as far as 60% water without elevating its original freezing point i.e. without reducing its frost resistance (what is even more, the latter increases between the limits treated). Applicant discovered that the rate of the ice-dissolution is high not only because of using a liquid composition, but also because the action is intensified on dilution in the treated 30–60% water content range. This advantage, not yet attained previously, can be attributed to the following three fundamental reasons.

1. Upon dilution of the present invention there is a increase in the frost resistance as far as the eutectic ratio of 8:4:7 coupled with the −28° C. freezing point i.e. a decrease in the freezing point from the original −18° C. to −28° C. The original freezing point can be attained by further dilution only at 60% water content again. In addition to the increase between the ambient temperature and the freezing point, there is an increase in the driving force and in the rate of the heat absorption (heat transport) from the ambience as well.

2. The greater change in temperature is due to a gradually diminishing density and viscosity, i.e. augmenting fluidity due to the increase in the water content, thereby the convective heat transport is also increasing and so is the rate of the ice dissolution for kinetic reasons.

3. The formation of the ternary liquid of 5:4:7 ratio according to the present invention is highly endothermic and, consequently, entails considerable heat removal from the ambience. For example, blending one kg of the chemicals' mixture of 4:7 mass ratio with the prescribed 0.455 kg water entails 163 kJ heat absorption, i.e. heat accumulation. Consequently, this heat of liquid formation is not to be removed from the ambience for ice dissolution any longer, opposed to the traditional processes with chemicals. Hence, in the final analysis, the heat, absorbed and accumulated from the ambience previously (viz. when manufacturing the liquid), is utilized for de-icing, contributing also to the intensification of the ice dissolution.

In this specification the expression "dissolution of the chemicals" as well as "solution of chemicals" has been avoided consciously, because at the 5:4:7 ratio the structure of the liquid, from scientific viewpoint, is closer to fusion than to the traditional solutions, the law of the latter (e.g.

Raoult's law) does not apply to the present invention. Making allowance for the endothermic liquid formation, the liquid, according to the present invention is a theoretic "ice solution".

The treated 5:4:7 mass ratio of the ternary system according to the present invention has similar properties to the 25:6:8 molar ratio (regardless of the dissociation of the ammonium-nitrate, which is, however, restricted on extreme conditions). Hence, the peculiar effects treated are reminiscent of the law of multiple ratio by weight known in the classic chemistry, by virtue of which the mole proportions that can be expressed by relatively small whole numbers define chemical bonds or compounds, leading to abrupt changes in the properties. This inference is supported also by the observation that a significant departure from the given ratio (e.g. surpassing the mass ratio of the components by ±10%) would result in a considerable change and disadvantageous alterations in the chemical properties. For example, if the urea—ammonium-nitrate ratio is beyond the range of the present invention, the heat of liquid formation (heat requirement of the blending) diminishes considerably and so does the rate of action, which is an important need for railway switches and for other objects that require the liquid to trickle down quickly from the surface to be de-iced. If the water content of the liquid is augmented beyond its limit, (i.e. it is diluted), the specific ice dissolving capacity is diminished without a noticeable increase in heat absorption from the ambience, (i.e. heat accumulation). If, on the other hand, the water concentration of the liquid is diminished, (i.e. it is concentrated), its frost resistance and thereby its transportability and applicability is restricted in return for a slight increase in ice dissolving capacity and specific heat accumulation. Allowing for all of these, both from theoretical and technical viewpoint, it seems reasonable that the liquid is characterized in that the water-urea-ammonium-nitrate mass ratio varies in the range of:

(4.5–5.5):(3.6–4.4):(6.3–7.7)

A further advantage of the liquid of the present invention is the combination of the speedy action with considerable and long-lasting ice dissolving and anti-skid effects. The liquid of the present invention is applied after the mechanical removal of the snow layer wherein the snow layer is loosened but not to the complete dissolution of the surface ice film or layer up to such an extent that it enables the mechanical removal of the adhering ice-and snow slush (scooping, sweeping). The use of the rock salt, in addition to the drawbacks previously stated, is problematic because the salt when strewn onto the surface, is consumed by the thawing of the ice particles on the surface and does not adhere to the concrete or asphalt. The liquid of the present invention permeates through the fissures of the ice layer to the adhering film and dissolves it quickly making the ice separable and removable from the surface. This mechanism requires about 50–100 g/m² of the chemicals depending on the temperature and the thickness of the crusty ice. Sprinkling out this liquid quantity, the crust becomes easily removable. On the other hand, as observed, the combination of the liquid with sand can be left undone which from economic and operational aspects is advantageous not only for strewing the combination but also for the subsequent cleaning of the road since the sand removal operation can be saved. The long-lasting protection which occurs, even without the application of sand, for several hours can be attributed to the hygroscopic and adhering properties of the mixture that ensures the surface humidity of the pavement and pathway during several hours, providing a sure protection against new sleet and icy rain. As known, icy drizzling, on account of the poor visibility on road surfaces, results in accidents on the roads as well as, an increase in the amount of sand that needs to be applied.

The present invention biodegrades in 2 to 4 weeks depending on the ambient temperature. This is advantageous from technical and ecological viewpoints since the harmful residues cannot be accumulated (e.g. on the metal surface). In fact, as opposed to the $Cl^-$ ion, the harmful residues are gradually diluted up to the complete disappearance. This is an important result as far as the degree of the environment hazard is concerned.

It has been pointed out that the liquid according to the present invention is less damaging to metallic (mainly iron and steel) surfaces than other liquids known in the art even when the liquid of the present invention is used with an inhibitor. The details of these tests can be omitted because the corrosion standards prescribe an immersion method not modelling the actual, practical use enabling the treated biodegradation. Hence, the comparative inundation tests e.g. of 6–8 months are not authoritative, because a contact longer than one month between the components of the liquid and the metallic elements embedded in the earth cannot come into being.

Metal surfaces can be protected, even during the intermediate contact period, if 1.5–2.0 mass % of benzoic-acid and 0.10–0.25 mass % benzo-or tolyl triazol is admixed to the ternary mixture, as corrosion inhibitors.

Although the above description gives the necessary knowledge for experts to use the liquid of the present invention, a closer study can be facilitated by the following examples as well.

EXAMPLE 1

In order to produce one ton of the product 305.3 kg of water is fed into a mixing reactor, thereafter, 246 kg of urea and 430.8 kg of ammonium-nitrate is admixed. It is necessary to admix the two fertilizer components simultaneously, because otherwise the ammonium-nitrate would not liquefy in water. During agitation of the mixture, 16.0 kg of benzoic-acid and 1.9 kg of tolyl triazol is added to be admixed. If no heat is available to pre-heat the water or to heat the mixture (e.g. in a duplicator), the mixture will turn cold (under 0° C.) then, after a long period of time, the mixture will approach ambient temperature. This entails no drawback except the slowing down of the liquefying.

The pH of the liquid so produced is in the range of 7.0–7.5. If required, correction can be done with some ammonia or nitric acid. The density of the mixture produced is 1.26 g/cm³, its thermodynamic freezing point (i.e. the temperature of the onset turbidity upon cooling) is −18° C. In winter, if no waste heat is available for the warming, it is practical to dissolve the inhibitors first and to admix the fundamental components thereafter.

The fundamental components of the liquid according to the present invention are identical with that of liquid nitrogen-fertilizer, but, with different composition. Since, the production of the solid raw-materials by evaporation, then by re-dissolution (with considerable heat requirement) is not a reasonable way, regardless of the omission of the water transport, if liquid nitrogen-fertilizer is available, it is practical to use it as intermediary, intensifying the production depending on its composition.

EXAMPLE 2

One of the known liquid fertilizer variables contains per ton 300 kg of water, 300 kg of urea and 400 kg of amnonium-nitrate and, accordingly, by both fertilizer components 140, altogether 280 kg of nitrogen has been admixed. To one ton of this, under stirring, 125 kg of ammonium-nitrate and 75 litres of water is to be added. Into this mixture 19.5 kg of benzoic-acid and 2.3 kg of tolyl-triazol has been dissolved previously. In this way 121.8 kg of product according to the present invention is produced, wherein the properties are identical with those of the composition of the former example. The control and correction of the pH, if needed, is done as previously described.

In conclusion, the advantages of the environment-saving snow-and ice thawing liquid according to the present invention, are its applicability by virtue of its speedy action to de-icing of surfaces with a very short contact-time can be ensured because of the speedy trickling down (e.g. railway switches), it provides long-lasting protection against renewed icy drizzling, it exerts no sodificating effect, its corrosivity is moderate and even this comes to an end in a few weeks, and the acting components of the liquid are becoming profitable as vegetal nutrients.

What we claim is:

1. A snow and ice dissolving composition comprising an aqueous solution of urea and ammonium nitrate wherein the ratio of water to urea to ammonium nitrate is (4.5–5.5):(3.6–4.4):(6.3–7.7).

2. The composition according to claim 1, wherein the ratio is 5:4:7.

3. The composition according to claim 2, wherein the composition comprises 31% water.

4. The composition according to claim 1, wherein the composition has a pH in the range of 7.0 to 7.5.

5. The composition according to claim 1, wherein the composition further comprises an inhibitor selected from benzoic acid, benzo triazol, or tolyl triazol.

6. The composition according to claim 5, wherein the inhibitor is 1.5–2.0 mass percent benzoic-acid and 0.10–0.25 mass percent benzo-or tolyl triazol.

7. A method of deicing a frozen surface comprising applying a composition comprising an aqueous solution of urea and ammonium nitrate wherein the ratio of water to urea to ammonium nitrate is (4.5–5.5):(3.6–4.4):(6.3–7.7).

8. The method according to claim 7, wherein the frozen surface is snow.

9. The method according to claim 7, wherein the frozen surface is ice.

* * * * *